(12) United States Patent
Weinzierle et al.

(10) Patent No.: US 12,379,460 B2
(45) Date of Patent: Aug. 5, 2025

(54) RADAR MODULE

(71) Applicant: VEGA Grieshaber KG, Wolfach (DE)

(72) Inventors: Christian Weinzierle, Wolfach (DE); Christoph Mueller, Oppenau (DE); Steffen Waelde, Niedereschach (DE)

(73) Assignee: VEGA Grieshaber KG, Wolfach (DE)

( * ) Notice: Subject to any disclaimer, the term of this patent is extended or adjusted under 35 U.S.C. 154(b) by 357 days.

(21) Appl. No.: 17/674,505

(22) Filed: Feb. 17, 2022

(65) Prior Publication Data

US 2022/0268882 A1 Aug. 25, 2022

(30) Foreign Application Priority Data

Feb. 19, 2021 (EP) ..................... 21158200

(51) Int. Cl.
*G01S 7/03* (2006.01)
*G01S 7/02* (2006.01)
*H01P 3/00* (2006.01)

(52) U.S. Cl.
CPC ............... *G01S 7/03* (2013.01); *G01S 7/027* (2021.05); *H01P 3/00* (2013.01)

(58) Field of Classification Search
CPC ..................................... G01S 7/027
See application file for complete search history.

(56) References Cited

U.S. PATENT DOCUMENTS

| 7,692,588 B2 * | 4/2010 | Beer | .................... | H01Q 9/0457 |
| | | | | 257/690 |
| 10,760,940 B2 | 9/2020 | Waelde et al. | | |
| 2007/0026567 A1 | 2/2007 | Beer et al. | | |
| 2008/0105966 A1 | 5/2008 | Beer et al. | | |
| 2016/0261015 A1 | 9/2016 | Deriso | | |
| 2018/0342778 A1 | 11/2018 | Deriso | | |

(Continued)

FOREIGN PATENT DOCUMENTS

| DE | 10 2006 023 123 A1 | 1/2007 |
| DE | 10 2015 119 690 A1 | 5/2017 |
| DE | 10 2017 112 894 A1 | 12/2018 |

(Continued)

OTHER PUBLICATIONS

Extended European Search Report issued Aug. 5, 2021 in European Patent Application No. 21158200.2 (with English translation of Category of Cited Documents), 9 pages.

(Continued)

*Primary Examiner* — Vladimir Magloire
*Assistant Examiner* — Eric K Hodac
(74) *Attorney, Agent, or Firm* — Oblon, McClelland, Maier & Neustadt, L.L.P.

(57) ABSTRACT

A radar module for process automation including process measurement technology and the automation industry is provided, the radar module including: a radar signal source configured to generate and to transmit, and/or to receive, a radar signal; and a dielectric radar signal guide configured to receive the radar signal and then to transmit the radar signal to an antenna, a waveguide, and/or a dielectric lens, the dielectric radar signal guide being arranged at a predetermined distance from the radar signal source, forming an intermediate space, and an end face of the dielectric radar signal guide facing the radar signal source at least partially has a metallic layer.

16 Claims, 4 Drawing Sheets

(56) References Cited

U.S. PATENT DOCUMENTS

2020/0249067 A1 8/2020 Mayer et al.
2022/0085478 A1 3/2022 Karau et al.

FOREIGN PATENT DOCUMENTS

| DE | 10 2019 101 276 A1 | 7/2020 | |
|----|----|----|----|
| EP | 0568511 B1 * | 10/1997 | |
| EP | 2683022 A1 * | 1/2014 | ........... G01F 23/284 |
| EP | 3 309 897 A1 | 4/2018 | |
| EP | 3 696 515 A1 | 8/2020 | |

OTHER PUBLICATIONS

European Office Action issued on Feb. 23, 2024 in European Patent Application No. 21158200.2, 31 pages.

\* cited by examiner

RADAR MODULE

CROSS-REFERENCE TO RELATED APPLICATIONS

This application claims the benefit of the filing date of European Patent Application No. 21 158 200.2, filed on 19 Feb. 2021, the entire content of which is incorporated herein by reference.

FIELD

The invention relates to radar modules for process automation, in particular for process measurement technology and the automation industry. In particular, the invention relates to a radar module for process automation, a level radar comprising such a radar module, and a use of such a radar module for process automation or monitoring of a space area.

BACKGROUND

In process automation, especially in level and/or limit level monitoring, a large number of semiconductor chips are used, but these should not be exposed to mechanical stresses if possible. Since semiconductors are made of crystals, they are usually very brittle and fragile. Even the smallest mechanical forces lead to fractures and thus to the destruction of the semiconductor. In addition, environmental influences such as moisture or particles affect the semiconductor, so that under certain circumstances its function cannot be maintained. Due to the increasing diversity of applications for radar chips, there is also a growing number of application scenarios in which radar chips should have increased resistance. In addition to process measurement technology, radar modules are also increasingly being used in automation technology, for example as distance and speed sensors.

SUMMARY

There may be a desire to provide an improved radar module that, in particular, provides improved transmission of a signal with improved bandwidth.

This desire is met by the subject-matter of the independent patent claims. Further embodiments result from the subclaims and the following description of embodiments.

A first aspect of the present disclosure relates to a process automation radar module, which may be particularly adapted for process measurement and/or the automation industry.

The radar module has a radar signal source and a dielectric radar signal conductor. The radar signal source is set up to generate and transmit and/or receive a radar signal, in particular a high-frequency radar signal. The dielectric radar signal guide is configured to pick up the radar signal emitted by the radar signal source in order to transmit the radar signal to an antenna, for example in the form of a dielectric lens. In this case, the radar signal guide is arranged at a predetermined distance from the radar signal source, forming an intermediate space, and an end face of the radar signal guide facing the radar signal source has a metallic layer at least in part.

The radar module enables transmission of signals, particularly in the higher frequency range of about 100 GHz to about 1 THz, preferably from about 120 GHz to about 500 GHz, further preferably from about 150 GHz to about 280 GHz. These frequency ranges allow smaller antenna designs to be used, making it possible to reduce the size of the radar modules. Furthermore, a higher frequency range results in advantageous absolute and/or relative bandwidths. In particular, it is possible to achieve a transition with a relative bandwidth equal to or greater than 5%.

The radar module is designed, for example, in form of a so-called Monolithic Microwave Integrated Circuit (MMIC). The radar signal source has a die that is part of a semiconductor wafer.

The radar signal guide is configured, for example, as a dielectric pin and acts as a dielectric waveguide that picks up the radar signal emitted by the radar signal source and passes it on to an antenna and/or a dielectric lens, optionally via a further waveguide. The radar signal waveguide may essentially be formed of a dielectric material, for example a plastic or a plastic mixture, and is thus more robust to mechanical stress than the radar signal source. Additionally or alternatively, the radar signal guide can also pass on a radar signal received by the antenna and/or the dielectric lens to the radar signal source.

In particular, in the event that the radar signal source generates and transmits a radar signal, especially a high-frequency one, the metallic layer serves to excite an electromagnetic signal with a predetermined waveguide mode in the radar signal guide. Electromagnetic waves are propagatable in a waveguide only in certain electric field and magnetic field orientations. Electromagnetic waves capable of propagating in a waveguide are also referred to as waveguide modes.

The space formed between the radar signal source and the radar signal guide mechanically decouples the radar signal source from the radar signal conductor, i.e., a mechanical load acting on the radar signal guide is not transmitted to the radar signal source. As a result, the radar signal source is protected from mechanical loads applied by the radar signal conductor. The predetermined gap between the end face of the radar signal guide and the radar signal source is essentially responsible for the high-frequency functionality of the transition, i.e., the coupling of the radar signal emitted by the radar signal source into the radar signal conductor, and is determined as a function of the frequency of the radar signal to be transmitted. In addition, the gap allows a transition from the radar signal source to the radar signal guide whose bandwidth is equal to or greater than 5%. This means that the radar module can also be used for radar-based level measurements and/or object detection, as well as other areas of application that require a wider bandwidth.

According to an embodiment, at least the intermediate space comprises a gas, a gas mixture, a fluid, or a vacuum. The interspace can thus have a dielectric material or be filled with a dielectric material that enables transmission of a radar signal from the radar signal source to the radar signal guide or vice versa, and at the same time ensures mechanical decoupling of the radar signal source from the radar signal conductor. Alternatively, a vacuum may be provided in the intermediate space.

According to an embodiment, the metallic layer has a recess at the end face facing the radar signal source, which has a non-metallic material. In particular, the recess exposes a dielectric material of the radar signal conductor. This means that the recess leaves the dielectric material of the radar signal guide exposed, so that the same medium is preferably located in the area of the recess as in the interspace, for example a gas, a gas mixture or a fluid, or a vacuum. The emitted radar signal can be coupled into the radar signal guide via the recess, where it excites a propagating waveguide mode.

According to one embodiment, the recess is arranged above an antenna structure of the radar signal source. The antenna structure is set up to transmit and/or receive the radar signal. The higher the frequency range, the smaller the antenna structure can be. This is particularly advantageous if the antenna structure is mounted directly on the radar signal source, since the cost of the radar signal source designed as a die depends on its size and contributes significantly to the cost of the radar module. The position of the cut-out above the antenna structure depends on the radar signal to be transmitted and can determine the polarization of the waveguide mode in the radar signal guide. The antenna structure can be designed in different ways. For example, according to one embodiment, the antenna structure may be formed as a patch element. Additionally or alternatively, the antenna structure may be shaped differently, in particular depending on the signal type generated. The antenna structure formed as a patch element can, for example, be excited with an unbalanced signal. Symmetrical signals can excite so-called bow-tie antennas, for example.

According to an embodiment, the radar signal source further comprises a high-frequency circuit that applies an electrical signal, in particular a high-frequency electrical signal, to the antenna structure. The electromagnetic field resulting from the electrical signal is emitted by the antenna structure as a radar signal. For the higher frequency ranges, in particular greater than 120 GHz, it is useful to arrange the antenna structure directly on the die in addition to the active high-frequency circuit in order to avoid conduction losses that would be experienced via bonding wires and/or printed circuit board substrates.

According to an embodiment, the recess is substantially slot-like, in particular rectangular. A slot-like, rectangular recess has a field image similar to a field image of a mode propagating in a dielectric waveguide. According to further embodiments, the recess may have any other shape.

According to a further embodiment, the metallic layer is applied to the end face facing the radar signal source in the form of a metallic patch. Metallic patches are preferably rectangular, square, or round, and are in particular vapor-deposited or glued on. A metallic patch can be used, in particular, if the end face of the radar signal guide facing the radar signal source is to be predominantly free of metal. In other words, a metallic patch can be used in particular if the metallic layer at the end face is to cover less than 75%, possibly even less than 65%, or less than 50% of the end face.

According to an embodiment, an additional waveguide is also provided, which is designed as a metallic waveguide or as a non-metallic, i.e., dielectric, waveguide and is arranged between the radar signal guide and the antenna. The coupling of the radar signal, in particular at high frequency, into a metallic waveguide has the advantage that there is no undesired radiation of the electromagnetic waves in any spatial directions. A non-metallic waveguide has lower attenuation properties than a metallic waveguide above about 150 GHz. In addition, non-metallic waveguides can be used as potential separation, since this eliminates the need for a metallic connection between the antenna and the electronics. Furthermore, the non-metallic waveguides can be manufactured more easily in longer pieces, especially in the high frequency range.

According to an embodiment, the metallic waveguide at least partially surrounds the radar signal guide in order to couple the radar signal from the radar signal guide into the waveguide, wherein the waveguide is connected to the antenna, e.g., a horn antenna, preferably integrally designed in one piece. The radar signal is radiated or received via the antenna. The antenna may further comprise a dielectric lens. The lens is used to focus the measurement signal.

According to an embodiment, the radar signal source is mechanically decoupled from a carrier material, preferably by means of an adhesive layer. This ensures that mechanical loads that may act on the carrier material are not transmitted to the radar signal source. In particular, the carrier material can be a printed circuit board substrate or a carrier of a standard chip package. Alternatively, the radar signal source can be soldered to the carrier material if the radar signal source and the carrier material have similar temperature expansion coefficients to avoid temperature-induced mechanical stresses.

According to an embodiment, the carrier material is further connected to the radar signal source by means of at least one bonding wire, wherein the bonding wire serves as a low-frequency supply and/or signal line. Additionally or alternatively, bond pads can also be used. Bonding wires as well as bonding pads serve to lead a supply voltage, signal lines, control lines, etc., down from the die.

According to a further embodiment, the metallic housing is attached to the carrier material, preferably glued, soldered, screwed, etc., and/or conductively connected to the carrier material. In particular, the metallic housing can completely surround the radar signal source. In this way, the radar signal source is protected and not exposed to environmental influences, such as dust, moisture, etc. Furthermore, undesirable electromagnetic radiation and irradiation can be avoided in this way.

According to an embodiment, the radar signal guide is mechanically held by means of a metallic holder, which is preferably integrally formed in one piece with the metallic housing of the radar signal source, the radar signal guide being pressed, soldered, glued, etc. to the holder, for example.

According to a further embodiment, the radar signal guide is mechanically held by means of a dielectric holder, which is preferably arranged in the metallic housing of the radar signal source, wherein the permittivity of the holder is smaller than the permittivity of the radar signal conductor. Due to the smaller permittivity of the dielectric holder, the functionality of the waveguide of the radar signal guide can be ensured. The difference in the permittivity of the two elements can be selected so that the radar signal remains within the radar signal conductor, since it is always deflected into the radar signal guide at the interface of the two elements due to the difference in permittivity.

According to an embodiment, an end of the radar signal guide facing away from the radar signal source is conical, frustoconical, paraboloidal, or hemispherical in shape. The shape of this end of the radar signal conductor can be adapted to the decoupling type. For example, for a waveguide, a cone or a truncated cone is particularly suitable as a shaping for this end of the radar signal guide. For coupling into another dielectric waveguide, as well as for radiation into air, a hemisphere can be particularly suitable as a shaping. The shaping allows the wave to be detached and transferred to the waveguide, etc.

According to an embodiment, a cross-section of the radar signal guide is circular, square, rectangular, oval, or elliptical. Preferably, the cross-section of the radar signal guide is selected such that the mode excited in the waveguide can either be decoupled or transferred to another waveguide. According to one embodiment, the superimposed waveguide/waveguide has any other cross-section. Round geometries are particularly easy to manufacture. Rectangular geometries are suitable for maintaining the polarization of the wave.

Another aspect of the disclosure relates to a level radar comprising a radar module described above and below.

Another aspect of the present disclosure relates to a use of a radar module described above and below for process automation or monitoring of a space area instead of a photoelectric sensor.

The advantages disclosed above for the disclosed radar module also apply to the disclosed level radar as well as to the disclosed use, and are not stated again to avoid repetition.

BRIEF DESCRIPTION OF THE FIGURES

Further embodiments are described below with reference to the figures. The representation in the figures is schematic and not to scale. The same or similar elements are given the same reference signs.

FIG. 7b shows a schematic representation of a positioning of the radar signal guide of FIG. 5 above the radar signal source of FIG. 7a.

DETAILED DESCRIPTION OF EMBODIMENTS

Figure 1:
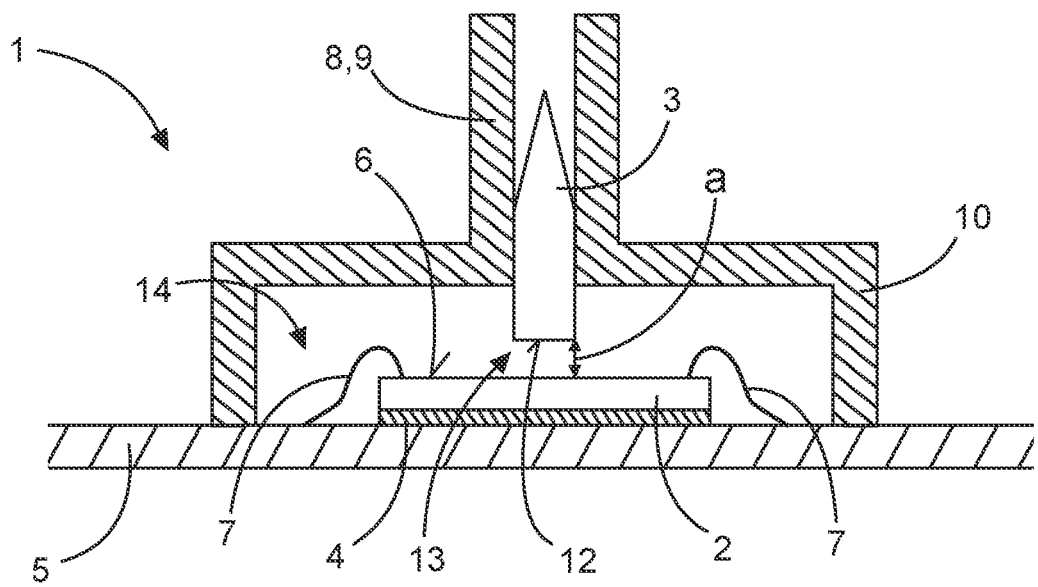
FIG. 1 shows a schematic sectional view of a section of a radar module according to an exemplary embodiment.

FIG. 1 shows a sectional view of a radar module 1 according to an exemplary embodiment. The radar module 1 has a radar signal source 2 and a dielectric radar signal guide 3. The radar signal source 2 is adapted to generate and transmit and/or receive a radar signal 100 (see FIG. 4). The radar signal guide 3 is designed to receive the radar signal 100 from the radar signal source 2 and to forward it to an antenna 11 (see FIG. 2) and/or to forward a radar signal from the antenna 11 to the radar signal source 2. The radar signal 100 is in particular a high-frequency radar signal in a frequency range from 100 GHz to 500 GHz, preferably from 150 GHz to 300 GHz, particularly preferably from 180 GHz to 280 GHz.

The radar signal source 2 has an unhoused part of a semiconductor wafer, a so-called die, and is attached to a carrier material 5 by means of an adhesive layer 4. The carrier material 5 is designed as a printed circuit board substrate and can be based, for example, on paper, glass fiber, glass fleece ceramic, a synthetic fluoropolymer of tetrafluoroethylene such as TEFLON®, etc., whereby printed circuit board substrates for the high frequency range are preferably based on ceramic or TEFLON®. A surface 6 of the radar signal source 2 is conductively connected to the substrate 5 by means of bonding wires 7. The bonding wires 7 serve in particular as low-frequency supply and signal lines, e.g., for a supply voltage, control lines, etc., for the radar signal source 2.

The dielectric radar signal guide 3 is arranged at a distance "a" from the surface 6 of the radar signal source 2 and is at least partially received in a waveguide 8 by means of pressing, soldering, or bonding, and is mechanically held by the latter. Thus, in this exemplary embodiment, the waveguide 8 serves as a holder 9 for the radar signal guide 3. Furthermore, the waveguide 8 is integrally formed in one piece with a metallic housing 10.

The metallic housing 10 is supported on the carrier material 5 and conductively connected to it. The metallic housing 10 is attached to the carrier material 5, e.g., by gluing, soldering, or screwing. Due to this arrangement, the waveguide 8 and any further elements connected to it, e.g., an antenna 11 (see FIG. 2), are supported on the carrier material via the metallic housing 10, and possible forces acting on the waveguide 8 and/or the antenna 11 are transmitted directly from the housing 10 to the carrier material 5, and not to the radar signal source 2.

Furthermore, the metallic housing 10 surrounds the radar signal source 2, protecting it from environmental influences, such as dust, moisture, etc. In addition, the metallic housing 10 can at least reduce or completely avoid unwanted electromagnetic radiation.

In this exemplary embodiment, the dielectric radar signal guide 3 is substantially cylindrical or pin-like in shape and may also be referred to as a single-coupling pin. The radar signal guide 3 is arranged such that an end surface 12 located at a longitudinal end faces the radar signal source 2. The distance a between the surface 6 of the radar signal source 2 and the end face 12 of the radar signal guide 3 is defined as a function of the frequency range of the radar signal to be transmitted and serves, among other things, to mechanically decouple the radar signal guide 3 from the radar signal source 2. This means that mechanical loads, for example due to forces acting on the radar signal guide 3, are not transmitted to the radar signal source 2. This protects the very fragile and brittle radar signal source 2 from mechanical loads.

An intermediate space or gap 13 formed by the distance "a" is here exemplarily filled with air. Alternatively, the gap 13 and optionally also the interior space 14 formed by the housing 10 can be filled with another dielectric gas or gas mixture, with a dielectric liquid, or with a vacuum, as long as the mechanical decoupling of the radar signal source 2 and the radar signal guide 3 is substantially maintained.

Figure 5:
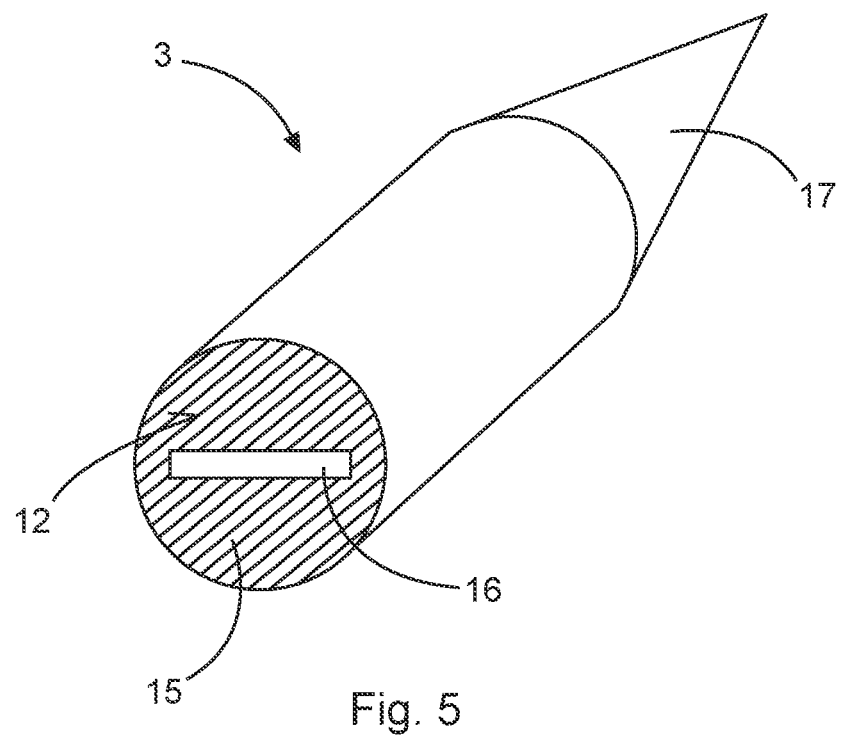
FIG. 5 shows a schematic diagram of a radar signal guide according to an exemplary embodiment.

With reference to FIG. 5, the radar signal guide 3 is shown in an exemplary embodiment. The end face 12 of the radar signal guide 3 facing the radar signal source 2 has at least partially a metallic layer 15, which is interrupted by a metal-free recess 16. In FIG. 5, the recess 16 is slot-like and essentially rectangular in shape. The metal-free recess 16 defines an area in which the radar signal 100 emitted by the radar signal source 2 is coupled into the radar signal guide 3. The metallic layer 15 serves as a shield, so that the radar signal 100 cannot be coupled into the radar signal guide 3 in the region of the metallic layer 15.

The radar signal guide 3 preferably has a round cross-section. Alternatively, the radar signal guide 3 may have a square, rectangular, oval, or elliptical cross-section. A round cross-section is particularly easy to manufacture. A radar signal guide 3 with a rectangular cross-section can maintain the polarization of the radar signal 100.

It should be noted that in the case of a radar signal transmission from the antenna 11 to the radar signal source 2, the directions are reversed. In this case, this means that the radar signal is coupled out of the radar signal guide 3 in the direction of the radar signal source 2 in the area of the recess 16, and the metallic layer 15 prevents the radar signal from being coupled out of the radar signal guide 3 in an area of the end face 12 other than the recess 16.

A longitudinal end of the radar signal guide 3 facing away from the radar signal source 2 is here exemplarily tapered, i.e., cone-shaped. The cone shape 17 (see FIG. 5) or a truncated cone shape (not shown) is particularly suitable for a transmission of the radar signal 100 between the radar signal guide 3 and the waveguide 8, as exemplarily shown in FIG. 1.

Figure 2:
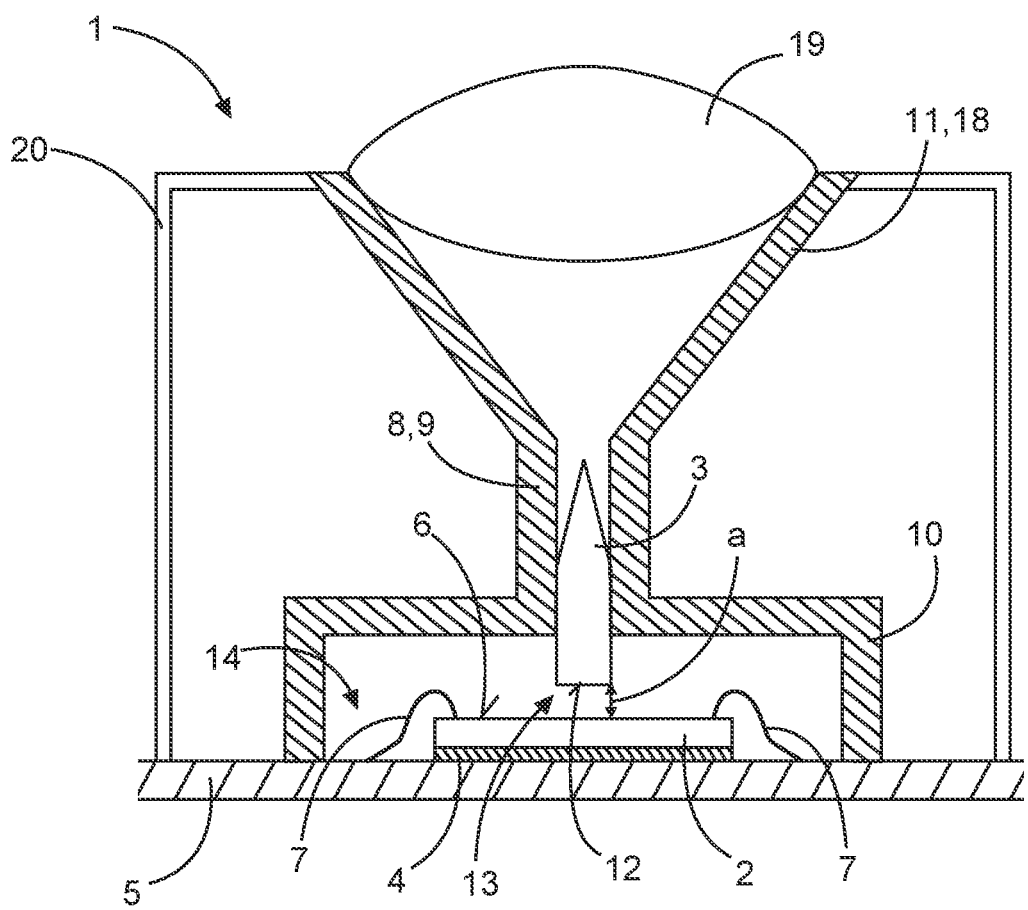
FIG. 2 shows a schematic sectional view of a radar module according to an exemplary embodiment.

FIG. 2 shows an exemplary embodiment of the radar module 1, which essentially corresponds to the embodiment shown in FIG. 1, which is why the similarities will not be discussed in more detail again. The exemplary embodiment shown in FIG. 2 differs from FIG. 1 essentially in that an antenna 11 designed as a horn antenna 18 is additionally arranged on the waveguide 8. The waveguide 8 and the horn antenna 18 are integrally formed in one piece. The radar signal can be radiated or received via the horn antenna 18. The horn antenna 18 is further provided with a dielectric lens 19, which serves to emit the radar signal outwardly to the surroundings and enables the horn antenna 18 to be shorter than without the lens 19. The lens 19 has a relative permittivity greater than 1, whereby the electromagnetic waves are deflected so as to form a beam bundle. In addition, FIG. 2 shows a radar module housing 20 which surrounds the entire radar module 1 except for the antenna 18. In the area of the antenna 18, the lens 19 serves to seal the radar module 1 from the outside and thus protect it from external influences, such as dirt, dust, moisture, aggressive media, etc.

Figure 3:
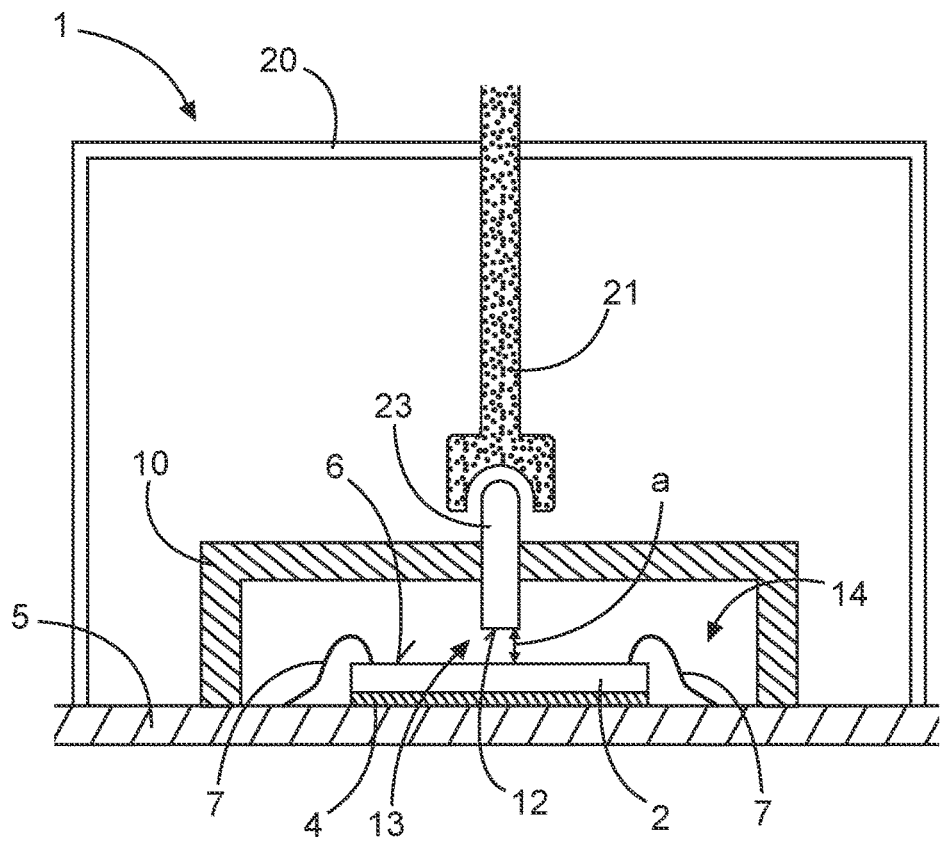
FIG. 3 shows a schematic sectional view of a radar module according to an exemplary embodiment.
Figure 4:
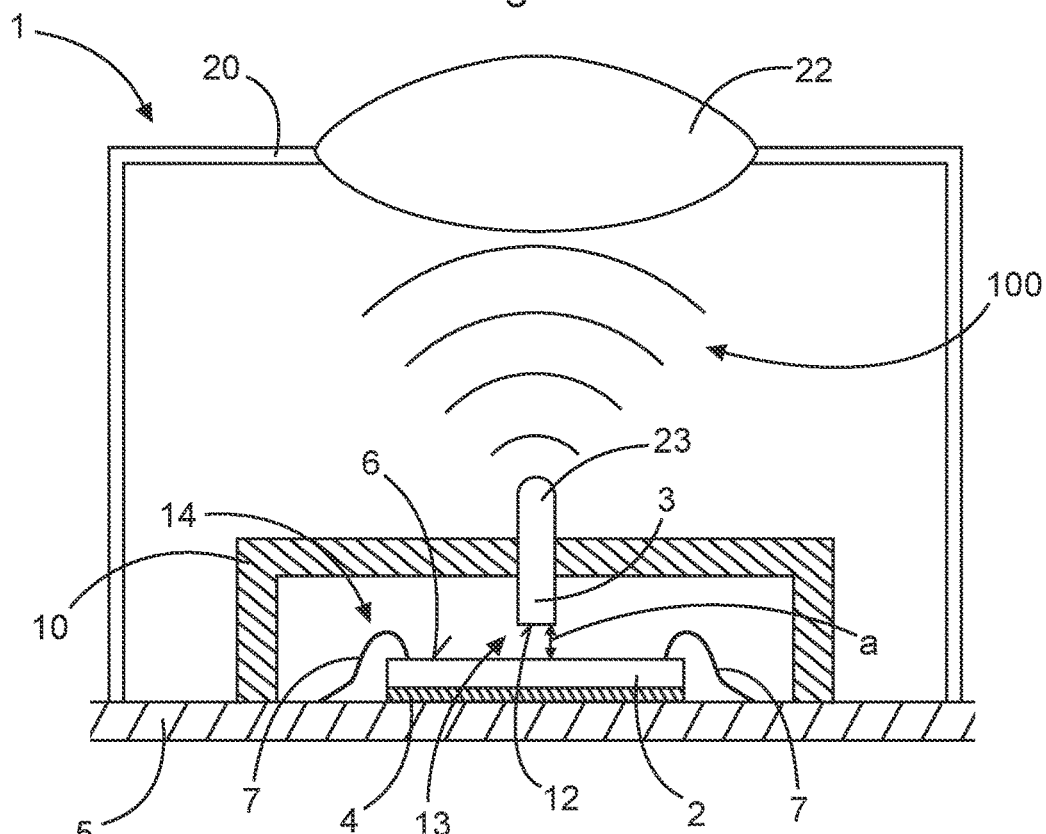
FIG. 4 shows a schematic sectional view of a radar module according to an exemplary embodiment.

FIG. 3 and FIG. 4 each show a further exemplary embodiment of the radar module 1, wherein the radar signal 100 is transmitted from the radar signal guide 3 into a further dielectric waveguide 21 (see FIG. 3) or is emitted from the radar signal guide 3 to the environment (see FIG. 4).

In these exemplary embodiments, the radar signal guide 3 is held in position by the metallic housing 10. Alternatively, the radar signal guide 3 may be held in place by a retainer made of a dielectric material (not shown) that is received, for example, within the metallic housing 10. The dielectric retainer preferably has a relative permittivity that is less than the relative permittivity of the radar signal guide 3, in order to maintain the functionality of the radar signal relay. For example, the radar signal guide 3 may comprise substantially polyether ether ketone (PEEK) and thus have a relative permittivity of about 3.2. The dielectric material may comprise, for example, substantially TEFLON® and thus have a relative permittivity of about 2.

In FIG. 3, the dielectric waveguide 21 may either transmit the radar signal 100 to an antenna 11 or directly radiate and/or receive it to the outside. The dielectric waveguide 21 may have the same or a different cross-section than the radar signal guide 3. In FIG. 4, a dielectric lens 22 is located at a predetermined distance from the radar signal guide 3 and is illuminated by the radar signal 100 emitted to the air by the dielectric waveguide 21. Various lens geometries are conceivable for the dielectric lens 22, with parabolic lens geometries having been shown to be particularly advantageous.

In FIGS. 3 and 4, the longitudinal end of the radar signal guide 3 facing away from the radar signal source 2 is formed as a hemisphere 23. The hemispherical shape has proven to be particularly advantageous for coupling the radar signal 100 into the dielectric waveguide 21 as well as for radiation in air.

Figure 6:
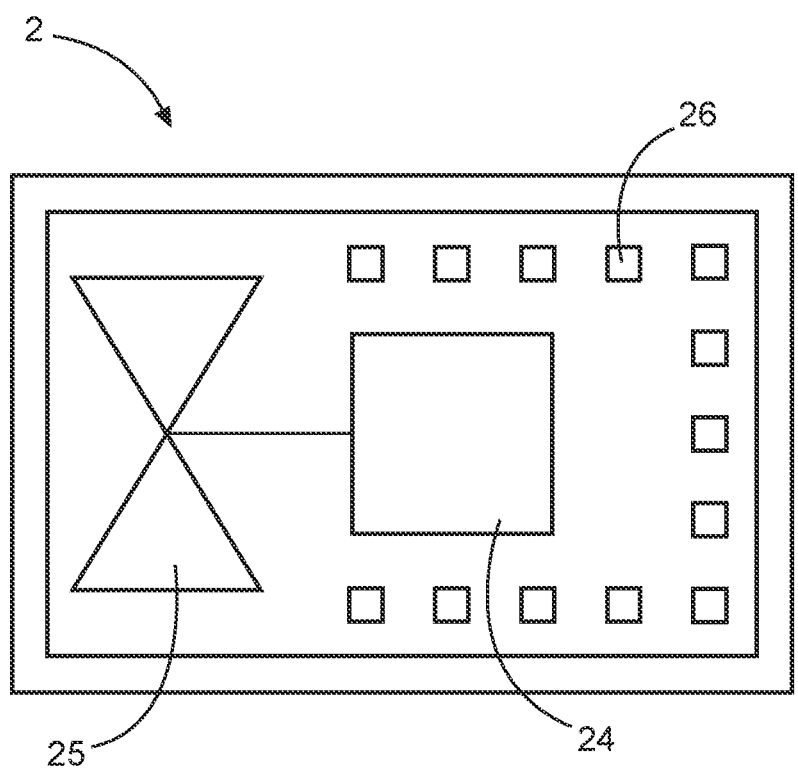
FIG. 6 shows a schematic diagram of a radar signal source according to one embodiment.
Figure 7A:
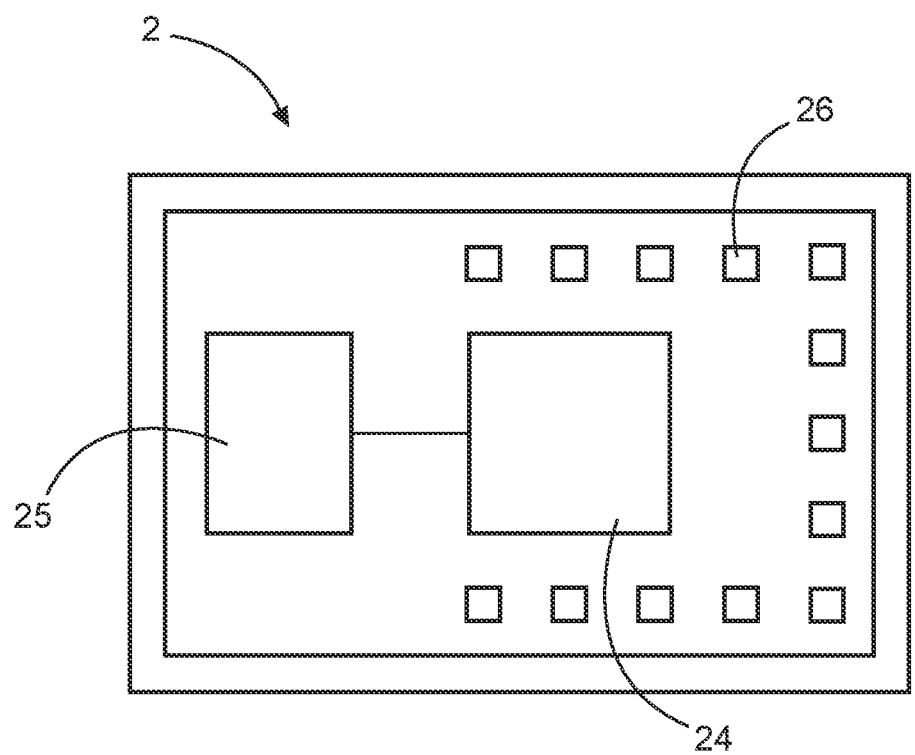
FIG. 7a shows a schematic diagram of a radar signal source according to an embodiment.
Figure 7B:
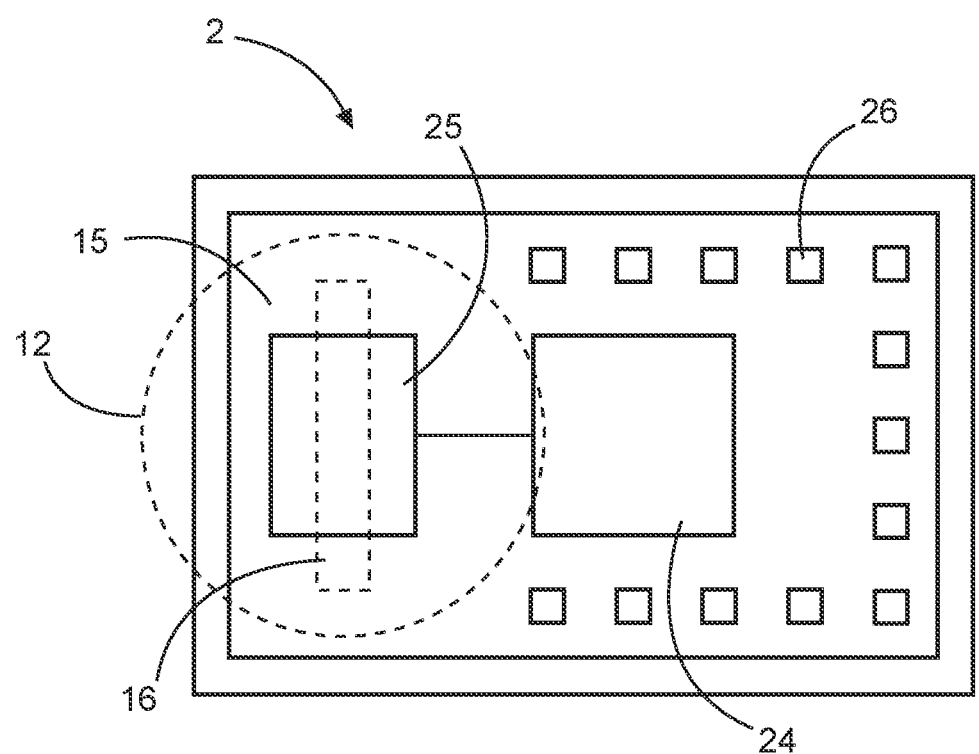

FIGS. 6, 7a, and 7b show various exemplary embodiments of the radar signal source 2. The radar signal source 2 has a high-frequency circuit 24, an antenna structure 25, and a plurality of bond pads 26. In particular, for the transmission of radar signals in a high frequency range, for example in a frequency range from about 120 GHz, it is useful to arrange or integrate the antenna structure 25 on the surface 6 of the radar signal source 2 in addition to the high frequency circuit 24, since in this frequency range the losses are considerably large in a transmission via a bonding wire or bonding pads and the carrier material. Since the antenna structure 25 is small in this frequency range due to its dependence on the wavelength of the radar signal 100, the antenna structure 25 can be well-integrated on the surface 6 of the radar signal source 2 without significantly enlarging the radar signal source 2.

The antenna structure 25 is coupled to the radio frequency circuit 24 and may be formed in various ways. For example, as shown in FIG. 6, the antenna structure 25 may be formed as a bow-tie antenna having an hourglass-like contour. Bow-tie antennas are preferably excited via symmetrical signals. Alternatively, the antenna structure 25 may be rectangular and/or may be formed, for example, as a patch element. Rectangular antennas are preferably excited via unbalanced signals. The size of the patch element is defined by the wavelength of the signal. The size of the patch element is selected in such a way that the patch element is set into resonance by the, in particular high-frequency, radar signal and its wavelength, i.e., is excited. This is mainly due to the long edge of the rectangular patch element. In FIG. 7b, the position of the radar signal guide 3 relative to the radar signal source 2 is shown by means of dashed contours. Here it can be seen that the end face 12 of the radar signal guide 3 is arranged above the antenna structure 25. Here, the position of the recess 16 relative to the antenna structure 25 is precisely determined to ensure coupling of the radar signal 100 emitted by the radar signal source 2 into the radar signal guide 3.

A rectangular recess 16, as shown in FIG. 7b, is particularly suitable because the field image of such a rectangular slot-like recess 16 resembles the field image of a mode propagating in a dielectric radar signal guide 3. The orientation of the rectangular recess 16 relative to the antenna structure 25 can be used to specify the polarization of the mode in the dielectric radar signal guide 3.

According to an exemplary embodiment, an electrical signal, preferably of high frequency, is applied to the antenna structure 25 via the high frequency circuit 24 to generate an electromagnetic field in the form of the radar signal 100. The radar signal 100 is transmitted through the gap 13, which may contain a dielectric medium, preferably air, or a vacuum, to the radar signal guide 3, where it excites a propagating waveguide mode at the end face 12 via the recess 16. The waveguide mode then passes through the radar signal guide 13 until it separates at the other end of the radar signal guide 3 via the geometry appropriately formed there. This means that in the embodiment shown in FIG. 1, the waveguide mode detaches from the radar signal guide 3 via the cone 17, into the waveguide 8, and is capable of propagation as a waveguide mode from there on. In the embodiments shown in FIG. 3 and FIG. 4, respectively, the waveguide mode detaches via the hemisphere 23 and propagates into the dielectric waveguide 21 and into the air, respectively.

It should be noted that with reference to the figures, the radar signal forwarding from the radar signal source 2 to the antenna 11, or outward to the surroundings, has been described. However, the radar module 1 is also designed to forward a radar signal received from the outside, for example through the antenna 11, to the radar signal source 2.

Supplementally, it should be noted that "comprising" and "having" do not exclude other elements or steps, and the indefinite articles "an" or "a" do not exclude a plurality. It should further be noted that features or steps that have been described with reference to any of the above embodiments may also be used in combination with other features or steps of other embodiments described above. Reference signs in the claims are not to be regarded as limitations.

The invention claimed is:

1. A radar module for process automation including process measurement technology and the automation industry, comprising:
   a Monolithic Microwave Integrated Circuit comprising a radar signal source configured to generate and to transmit a radar signal;
   a waveguide; and
   a dielectric radar signal guide in a shape of an elongate pin having a diameter smaller than a length of the dielectric radar signal guide, arranged between the Monolithic Microwave Integrated Circuit, and thus the radar signal source, and the waveguide the dielectric radar signal guide being partially received in the waveguide, and being configured to receive the radar signal and then to transmit the radar signal into the waveguide,
   wherein the dielectric radar signal guide is arranged at a predetermined distance from the Monolithic Microwave Integrated Circuit, and thus from the radar signal source, forming an intermediate space, the predetermined distance being smaller than the length of the dielectric signal guide,
   wherein an end face of the dielectric radar signal guide facing the radar signal source at least partially has a metallic layer,
   wherein the metallic layer has a recess in the form of a slot on the end face facing the radar signal source, the recess comprising a non-metallic material, and
   wherein the recess is arranged above an antenna structure of the radar signal source.

2. The radar module according to claim 1, wherein at least the intermediate space comprises a gas, a gas mixture, a fluid, or a vacuum.

3. The radar module according to claim 1, further comprising an additional waveguide, which is formed as a metallic waveguide or as a non-metallic waveguide and is arranged between the dielectric radar signal guide and the antenna structure.

4. The radar module according to claim 3,
   wherein the additional waveguide formed as the metallic waveguide at least partially surrounds the dielectric radar signal guide and is configured to couple the radar signal from the dielectric radar signal guide into the metallic waveguide, and
   wherein the metallic waveguide is connected to the antenna structure.

5. The radar module according to claim 4, where the metallic waveguide is integrally formed with the antenna structure.

6. The radar module according to claim 1, wherein the radar signal source is mechanically decoupled from a carrier material.

7. The radar module according to claim 6, wherein the carrier material is further conductively connected to the radar signal source by means of at least one bonding wire, which serves as a low-frequency supply and/or signal line.

8. The radar module according to claim 6, wherein a metallic housing substantially completely surrounds the radar signal source and is attached to and/or is conductively connected to the carrier material.

9. The radar module according to claim 8, wherein the dielectric radar signal guide is mechanically held by a metallic holder.

10. The radar module according to claim 9, wherein the metallic holder is integrally formed in one piece with the metallic housing of the radar signal source.

11. The radar module according to claim 8,
    wherein the dielectric radar signal guide is mechanically held by a dielectric holder, and
    wherein a permittivity of the dielectric holder is smaller than a permittivity of the dielectric radar signal guide.

12. The radar module according to claim 11, wherein the dielectric holder is arranged in the metallic housing of the radar signal source.

13. The radar module according to claim 1, wherein the radar signal source is mechanically decoupled from a carrier material by means of an adhesive layer.

14. The radar module according to claim 1, wherein a cross-section of the dielectric radar signal guide is round, square, rectangular, oval, or elliptical.

15. A level radar, comprising a radar module according to claim 1.

16. The radar module according to claim 1, wherein the radar module is configured for process automation or monitoring of a space area.

* * * * *